(12) United States Patent
Koryakin

(10) Patent No.: US 11,669,345 B2
(45) Date of Patent: Jun. 6, 2023

(54) SYSTEM AND METHOD FOR GENERATING PREDICTION BASED GUIS TO IMPROVE GUI RESPONSE TIMES

(71) Applicant: INGRAM MICRO INC., Irvine, CA (US)

(72) Inventor: Rostislav Koryakin, Moscow (RU)

(73) Assignee: CloudBlue LLC, Irvine, CA (US)

( * ) Notice: Subject to any disclaimer, the term of this patent is extended or adjusted under 35 U.S.C. 154(b) by 449 days.

(21) Appl. No.: 15/920,319

(22) Filed: Mar. 13, 2018

(65) Prior Publication Data

US 2019/0286458 A1    Sep. 19, 2019

(51) Int. Cl.
  *G06F 9/451*    (2018.01)
  *G06F 3/0481*    (2022.01)
  *G06N 7/00*    (2023.01)
  *G06N 7/01*    (2023.01)

(52) U.S. Cl.
  CPC ............ *G06F 9/451* (2018.02); *G06F 3/0481* (2013.01); *G06N 7/01* (2023.01)

(58) Field of Classification Search
  CPC ........ G06F 9/451; G06F 3/0481; G06N 7/005
  See application file for complete search history.

(56) References Cited

U.S. PATENT DOCUMENTS

| 6,249,795 B1 * | 6/2001 | Douglis ............... G06F 16/957 715/210 |
| 8,386,966 B1 | 2/2013 | Attinasi et al. |
| 8,468,110 B1 | 6/2013 | Podgorny et al. |
| 10,467,029 B1 * | 11/2019 | Lin .......................... G06F 9/451 |
| 2002/0129006 A1 * | 9/2002 | Emmett ................ G06F 16/986 |

(Continued)

FOREIGN PATENT DOCUMENTS

| JP | 2008-071092 | 3/2008 |
| JP | 2010-224589 | 10/2010 |
| WO | 2014066908 A1 | 5/2014 |

OTHER PUBLICATIONS

PCT/US2019/021874, International Search Report, International Searching Authority, dated Jun. 6, 2019.

(Continued)

*Primary Examiner* — Thu V Huynh
(74) *Attorney, Agent, or Firm* — Ice Miller LLP

(57) ABSTRACT

A graphical user interface (GUI) (or a user navigation interface), is a common feature of computer systems and application well known to one having ordinary skill in the arts. In cloud service broker (CSB) environments, GUI rendering is more complicated because independent software vendors (ISV) distribute cloud applications (cloud services) through CSBs and allow different cloud applications to collaborate through standardized representational state transfer (RESTful) application program interfaces (API). If there are multiple applications that are integrated, the GUI may include numerous interfaces specifically tailored to the each of the specific applications. However, preparing all combinations of screens requires extensive development, which increases as more and more applications are integrated. The present disclosure relates to a system and method for dynamic creation of user navigation interfaces based on prediction, based on shared connector packages and predictive behavioral GUI model building, to enable faster GUI response times.

21 Claims, 7 Drawing Sheets

(56) References Cited

U.S. PATENT DOCUMENTS

| | | | |
|---|---|---|---|
| 2008/0010534 A1 | 1/2008 | Athale et al. | |
| 2013/0073409 A1 | 3/2013 | Burkard et al. | |
| 2013/0073509 A1 | 3/2013 | Burkard | |
| 2013/0097521 A1 | 4/2013 | Lewin et al. | |
| 2013/0174064 A1* | 7/2013 | Shikasho | G06F 3/048 715/762 |
| 2013/0290878 A1* | 10/2013 | Li | G06F 9/451 715/762 |
| 2013/0326376 A1* | 12/2013 | Stachniak | G06F 3/0412 715/762 |
| 2014/0180744 A1 | 6/2014 | Kozloski et al. | |
| 2015/0019991 A1* | 1/2015 | Kristjansson | H04L 41/0853 715/747 |
| 2015/0026349 A1 | 1/2015 | Iyoob | |
| 2015/0082251 A1* | 3/2015 | Lam | G06F 16/955 715/843 |
| 2015/0143247 A1* | 5/2015 | Diester | G06F 3/0486 715/739 |
| 2015/0286355 A1* | 10/2015 | Prasad | G06F 11/3668 715/763 |
| 2018/0025283 A1* | 1/2018 | Kobayashi | G06Q 50/01 706/53 |
| 2018/0197103 A1* | 7/2018 | Petursson | G06K 9/00456 |
| 2018/0203571 A1* | 7/2018 | Dayanandan | G06T 7/73 |
| 2018/0315103 A1* | 11/2018 | Lakshminarayan | G06Q 30/0601 |
| 2019/0026215 A1* | 1/2019 | Agarwal | G06F 11/3688 |

OTHER PUBLICATIONS

PCT/US2019/021874, Written Opinion of the International Searching Authority, International Searching Authority, dated Jun. 6, 2019.
Japanese Office Action issued in JP 2020-548922, dated Nov. 2, 2021, and English translation thereof.

* cited by examiner

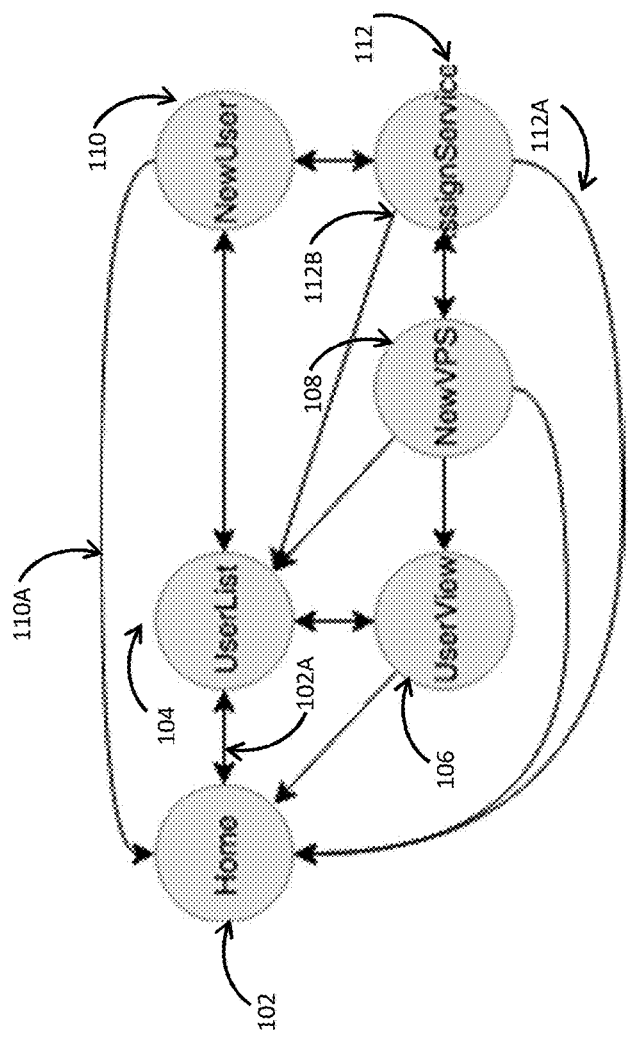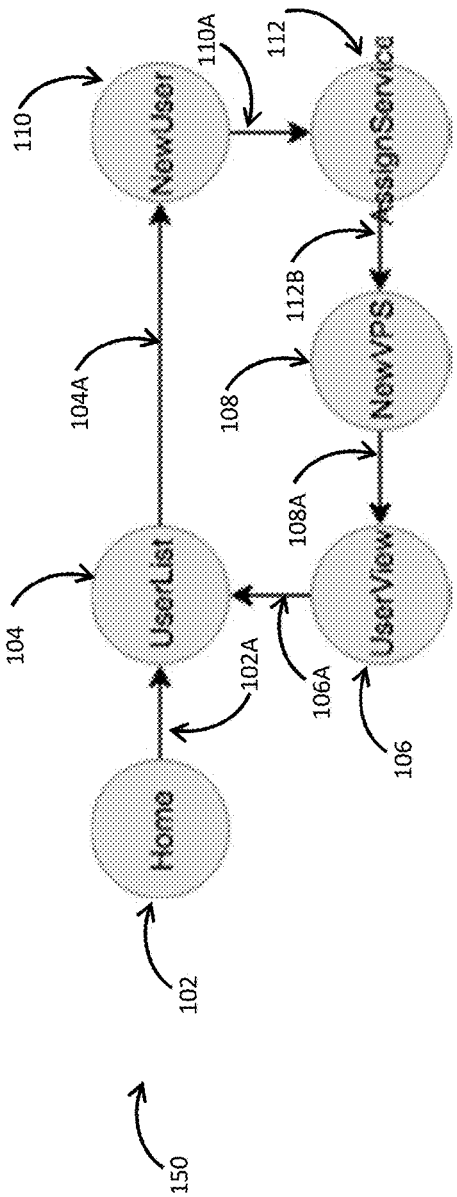
FIG. 1A
FIG. 1B

SYSTEM AND METHOD FOR GENERATING PREDICTION BASED GUIS TO IMPROVE GUI RESPONSE TIMES

TECHNICAL FIELD

This disclosure relates to a system and method for dynamic creation of user navigation interfaces based on prediction, to improve navigation interface response times.

BACKGROUND

A graphical user interface (GUI) or alternatively referred to as a user navigation interface, is a common feature of computer systems and application well known to one having ordinary skill in the arts. Traditional GUIs operate to present a user a front-end navigational interface that communicates with a back-end to pull data and information, or perform actions. In such traditional embodiments, the GUIs may be considered to provide a particular context that includes navigation or control items such as, a clickable button, a link, a slider, or the like. The purpose of such navigation or control items is to enable a user to operate the GUI to perform a desired action. Upon operation of the GUI using a navigation or control item, the GUI generates a response action which requires the GUI to communicate with the back-end. For example, if the user would like to retrieve information via a GUI, the GUI might include a control item such as an "OPEN" control item, which when operated, initiates a response action that requires the GUI to retrieve data from the operationally connected back-end, and display such data to the user via the GUI. In such traditional embodiments, the response action depends on the particular operation performed by the user (i.e. if the user does not operate the "OPEN" control item, the GUI may not have to retrieve data from the back-end as a response action).

In addition to retrieving data from the back-end the GUI context may also need to be changed. For example, control items within the GUI may need to change whereby the previously displayed GUI control items are no longer relevant. Continuing with the example above, after the user operates the "OPEN" control item and the GUI retrieves data from the back-end and displays the same, the "OPEN" control item may no longer be relevant because the information has now been retrieved. In such an example, the "OPEN" control item may be replaced with a "CLOSE" control item that allows the user to close or otherwise terminate an operation within the GUI.

In such a traditional embodiment, the future state of the GUI (i.e. the change to a new control item) is dependent on the actions of the user in the present state of the GUI. That is, when actions are performed in the GUI in the present state, the GUI will transition to a new/future state which may include communicating with back-end to perform the action and accordingly present the user with a response. In such embodiments, the response from the back-end may be delayed or otherwise includes latency, whereby the transition of the GUI from the present state to the new/future state may also be delayed. The user experience in such cases is not ideal because the user has to wait as the GUI awaits a response from the back-end. Excessive wait times or latency are common especially in situations where the back-end is under high operational load (i.e. the GUI takes longer to respond to a user action because the GUI has not received a response from the back-end and is waiting). The additional wait time inevitably leads to a poor user experience because the user is now delayed in performing his/her operation or transaction.

Moreover, security considerations add additional overhead in managing GUI transition. For example, a user attempting to operate a GUI can also do so within the confines of the user's authorization (i.e. a user cannot perform an action that the user is not authorized to). Therefore, factoring in security controls adds additional processing time whereby the latency is further increased.

In cloud service broker (CSB) environments, GUI rendering may be more complicated. The operation of CSBs is disclosed in U.S. Utility patent application Ser. No. 15/142,256, for METHOD AND STANDARD FOR INTEGRATING APPLICATIONS INTO A CLOUD, which application is incorporated in its entirety, by reference. An application packaging standard (APS) is a method for independent software vendors (ISV) to distribute cloud applications (cloud services) through CSBs and allow different cloud applications to collaborate through standardized representational state transfer (RESTful) application program interfaces (API). It helps ISVs to integrate their applications with APS-enabled CSBs by creating a connector package (made according to an APS) for each application.

In some traditional embodiments, the connector package may include an archive file that contains metadata, control method descriptions, and content files, which are usable to declare and define the application resources, services, user interface components, and logic of control methods necessary for managing resources (i.e. a schema of resources which can be created that is applicable to each individual application). The connector package further includes information about an application GUI, such as, for example, the screen layout, navigation controls, forms, and the like. The connector package may further include declarative files used to define the ISV's application resources and of the "connector frontend"—the web-interface that a CSB customers views when accessing the CSB interface. In such CSB environments, a web-interface is developed by the connector package developers using particularized frameworks, which may include widgets, predefined page structure, navigation methods and screen insertion mechanism. For example, a typical connector frontend consists of screens inserted into predefined views, custom logic for rendering widgets and custom navigation structure. The widgets may display information that connector developer considers to be valuable for the customer of the corresponding cloud application, e.g. usage reporting, subscription and service information, instructions and so on.

This integration allows for the management of integrated cloud applications through single web panel with common style and collection of controls (i.e. an integrated GUI). For example, Dropbox® may be one of the applications available from an ISV. When a user accesses Dropbox®, the Dropbox® connector application facilitates the user's activity by presenting the appropriate screens/GUI interfaces (i.e. the Dropbox® connector application manages the GUI activity of the user). Continuing with this example, if there are multiple applications that are integrated, the GUI may include numerous interfaces specifically tailored to the each of the specific applications. In such an example, all of the possible screens must be determined in order for the integration between the numerous applications to occur seamlessly (as viewed by the user). However, preparing all combinations of screens requires extensive development, which increases as more and more applications are integrated. Moreover, fetching GUI screens in real-time (i.e.

when a user is using the application) creates for slowness because the CSB environment may need to compute the appropriate GUI screen to render, from a vast number of possible GUI screen combinations.

Therefore there is a need for a system and method for generating prediction based GUIs to improve GUI response times.

SUMMARY

The present disclosure relates to a system and method for dynamic creation of user navigation interfaces based on prediction, to improve navigation interface response times. In at least one embodiment, a method for generating prediction based graphical user interface (GUI) screens to improve GUI screen response times is provided. The method includes receiving at an endpoint, a view request for a GUI screen, the GUI screen comprising an integrated user interface constructed from of a plurality of connector packages, validating at a predictor, a validity of a GUI transition model, the GUI transition model corresponding to each of the plurality of connector packages, building at a behavior model builder, a new GUI transition model, the new GUI transition model comprising a plurality of transition probabilities for each possible transition from the GUI screen, the plurality of transition probabilities depending at least in part on resource attributes available to each of the plurality of connector packages, selecting at the behavior model builder, a likely transition from the plurality of transition probabilities, the likely transition being a transition to a new GUI screen that is most likely to be requested, creating at a navigation module, a navigation tree based at least in part on the likely transition and returning a response to the endpoint, the response comprising the navigation tree, and further comprising a navigation response for the new GUI screen.

In at least one embodiment of the present disclosure, the method includes transition models selected from a group consisting of an Ngram model, a hidden Markov model, and a maximum entropy Markov model.

In at least one embodiment of the present disclosure, the method includes the transition models further include boosted classifiers selected from a group consisting of support vector machine (SVM), decision tree, random forest, and nearest K neighbors.

In at least one embodiment of the present disclosure, the method includes a request for the GUI screen that is received from a client, and a GUI transition model that includes a security scope modification date.

In at least one embodiment of the present disclosure, the method includes validating the GUI transition model includes checking a last modified security scope date, and when the GUI transition model was last modified.

In at least one embodiment of the present disclosure, the method includes checking at the predictor, if there is sufficient data to re-calculate plurality of transition probabilities for each possible transition from the GUI screen, re-calculating at the predictor, the plurality of transition probabilities for each possible transition from the GUI screen, and creating a new GUI transition model, based at least in part on the data, setting at the predictor, a new GUI transition model creation date, and operating the cache filler, the cache filler configured to replace the original GUI transition model in a cache with the new GUI transition model.

In at least one embodiment of the present disclosure, the data includes GUI screen transitions and boosting classifiers.

The transition probabilities further include calculating an array of probabilities, based at least in part on the booster classifiers.

In at least one embodiment of the present disclosure, the method includes receiving at a REST endpoint, a navigation request for a first GUI screen, checking at a predictor, a security scope modification date, the security scope modification date comprising a set of resources available to a user for whom the navigation request for the first GUI screen is being requested, retrieving at the predictor, a GUI transition model, the GUI transition model identifying a new GUI screen for transition from the first GUI screen, checking at the predictor, if the transition probability model is newer than the security scope modification date, and retrieving at the predictor, a response, the response comprising a navigation tree with a link to the new GUI screen source code and current resource state of a user necessary for executing the GUI screen source code.

In at least one embodiment of the present disclosure, the navigation tree is a navigation graph showing GUI transitions. In at least one embodiment of the present disclosure, the method includes checking the predictor includes the step of cleaning the GUI transition model and requesting creation of a new GUI transition model, if the transition probability model is older.

In at least one embodiment of the present disclosure, the system includes a cloud service broker platform including a predictor, a database, a behavior model builder configured to create a GUI transition model, a cache filler configured to retrieve the most probable GUI views to be visited by a user, based at least in part on the GUI transition model, a navigation module configured to create navigation responses, a cache cleaner configured to clean a response cache, and a REST endpoint configured to simulate a GUI navigation service endpoint.

In at least one embodiment of the present disclosure, the system includes a client operably connected to the cloud service broker platform, and configured to request a new GUI screen and receive a navigation response for the new GUI screen.

In at least one embodiment of the present disclosure, the cloud service broker controller comprises a plurality of connector applications, the each of the plurality of connector applications configured for each application for integration via the cloud service broker platform, and wherein the connector packages include user interface modules for constructing navigation elements, and a security scope for each of the navigation elements.

BRIEF DESCRIPTION OF THE DRAWINGS

The embodiments and other features, advantage, and disclosures contained herein, and the manner of attaining them, will become apparent and the present disclosure will be better understood by reference to the following descriptions of various exemplary embodiments of the present disclosure taken in conjunction with the accompanying drawings, wherein:

FIG. 1A displays an exemplary state diagram of a navigation path with all possible navigation transitions.

FIG. 1B displays an exemplary state diagram of simple navigation path.

DETAILED DESCRIPTION

Figure 1C:
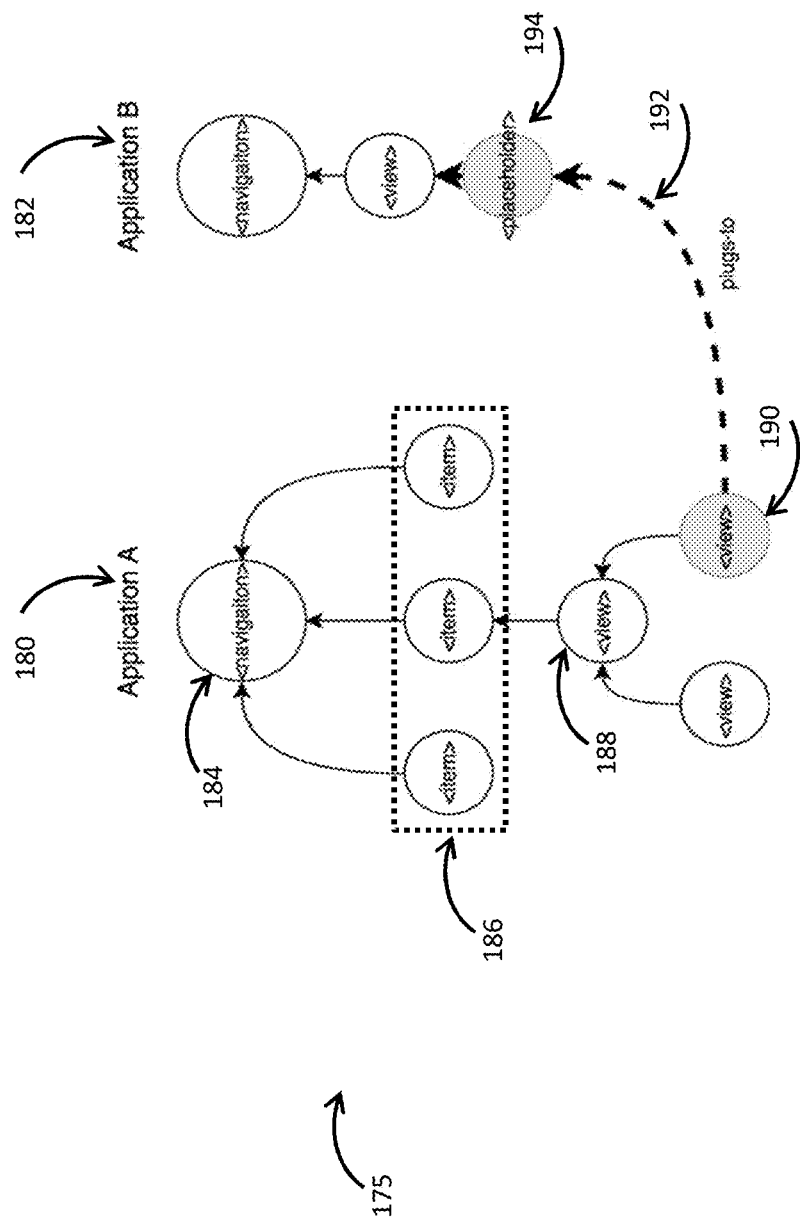
FIG. 1C displays an exemplary navigation tree assembled via placeholders (prior art).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs implemented by the system may be written in any programming language—interpreted, compiled, or otherwise. These languages may include, but are not limited to, Xcode, iOS, cocoa, cocoa touch, MacRuby, PHP, ASP.net, HTML, HTML5, Ruby, Perl, Java, Python, C++, C#, JavaScript, and/or the Go programming language. It should be appreciated, of course, that one of skill in the art will appreciate that other languages may be used instead, or in combination with the foregoing and that web and/or mobile application frameworks may also be used, such as, for example, Ruby on Rails, System.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architecture through one or more application programming interfaces or otherwise.

Referring to FIG. 1A, it is shown an exemplary state diagram of a navigation path with all possible navigation transitions, generally indicated at 100. State diagram 100 includes a plurality of GUI states (i.e. 102, 104, 106, 108, 110, and 112). In at least one embodiment of the present disclosure, the each GUI state is indicative of present GUI state. For example, when a user first operates the GUI, the GUI may be initialized to GUI state 102 (Home) and the GUI may feature accompanying information or control items therein, appropriate for GUI state 102. For each of the GUI states, there is at least one transition to another GUI state. By way of examples, GUI state 102 (Home) has only one transition 102A to GUI state 104 (UserList); GUI state 112 (Assign Service) includes transition 112A to GUI state 102, and transition 112B to GUI state 104. It will be appreciated that a GUI state transition is indicative of an action or operation (e.g. performed by a user by operation of a GUI control item), that transitions the GUI from the present state, to the next/future state. Continuing with the example above, if a GUI is initialized to GUI state 102, the operation(s) available within the GUI state 102 will invoke a transition 102A so that the GUI transitions to GUI state 104. Similarly, if the GUI state is presently at GUI state 112, a user may be presented with GUI functions that may be operably selected to allow the GUI to GUI state 102 (via transition 112A), or to GUI state 104 (via transition 112B). It will be further appreciated that state diagram displays all possible navigation transitions given a present GUI state. It will be appreciated that the each of the GUI states may be independently created by an ISV for their respective applications.

Referring now to FIG. 1B, it is shown an exemplary state diagram 150, of a simple navigation path, according to at least one embodiment of the present disclosure. In state diagram 150, GUI state 102 is the initial state (i.e. a user is initialized to view the GUI as presented in GUI state 102). By way of example, upon operation of the GUI, the GUI transitions to GUI state 104 via transition 102A; at GUI state 104, the GUI transitions by operation to GUI state 110, via transition 104A; at GUI state 110, the GUI transition by operation to GUI state 112, via transition 11A; at GUI state 112, the GUI transitions by operation to GUI state 108, via transition 112B; at GUI state 108, the GUI transitions by operation to GUI state 106, via transition 108A; and finally, at GUI state 106, the GUI transitions to GUI state 104, via transition 106A.

Continuing with this exemplary embodiment, it will be appreciated that the state diagram 150 shows a navigation path whereby a user operates along this navigation path to accomplish a specific task. For example, in order to provision a user in a cloud service broker (CSB) platform (as disclosed further herein), an administrator will be initialized to start at a Home screen (GUI state 102), which Home screen may be the starting point available at a CSB platform control panel. At the Home screen (GUI state 102), the administrator may be presented with a menu including at least one control item such as a link to a user list. Upon operation of the control item (i.e. clicking on the link to the user list), the GUI transitions to the User list screen (GUI state 104). It will be appreciated that at each GUI screen (i.e. GUI state), a list of available control items may be provided. It will be appreciated that the control items allow the administrator to navigate from one GUI screen to the next. It will be further appreciated that there are two kinds of navigation transitions: dynamic and static. In at least one embodiment of the present disclosure, a static transition is a transition which is declared in the navigation description of the GUI screen. That is, static transitions are predefined for transition from one GUI screen to the next GUI screen. It will be appreciated that this creates a 'rigid' relationship between the two GUI screens.

Continuing with the above example, at the User List screen (GUI state 104), the administrator may again be provided with a menu including control items, which control items may include a link to be able to add a new user. Upon operating the link to add a new user, the GUI transitions to the New User screen (GUI state 110) whereby the administrator is allowed to add a new user to a system. At the New User screen (GUI state 110) the administrator may operate the GUI to add a new user, and may also be provided with a menu including control items to transition to the next GUI screen (i.e. Assign Service (GUI state 112)). Continuing with the above example, the administrator may operate the control item to allow for the assignment of CSB platform services to the user at the Assign Service screen (GUI state 112). Upon completion of that assignment, the administrator may operate the GUI to transition to the new virtual private server (VPS) (which VPS service is assigned at step 112) screen (GUI state 108), after which the administrator can transition to User View (GUI state 106), and finally back to the user List screen (GUI state 104). It will be appreciated that the foregoing navigation transitions are an exemplary embodiment of the performance of an action by an administrator on the CSB platform.

Referring now to FIG. 1C, it is shown an exemplary navigation tree assembled via placeholders, generally indicated at 175. In at least one embodiment of the present disclosure, the navigation tree 175 includes application 180 and application 182. It will be appreciated that the applications 180 and 182 may be any applications available via the CSB platform. The application 180 further includes navigation root 184 and menu item 186. The menu item 186 further includes view 188 and right view 190. In at least one embodiment of the present disclosure, placeholders are used to integrate the GUI of application 180 and application 182. For example, application 180 and application 182 may each include connector package associated with a connector application. In order for connector application 182 to be able to operably connect to application 180, the GUI screens of the respective applications need to be operably connected via placeholders. In at least one embodiment of the present disclosure, application 180 is configured to embed right view 190 into the placeholder 194 of the application 192. It will be appreciated that during the generation of GUI screens for the operation of a particular application (i.e. either application 180 or application 182), static connections are built between the navigation trees of application 180 and application 182, so that right view 190 has two parent nodes (i.e. view 188 and placeholder 194) and conversely, the two parent nodes (view 188 and placeholder 194) have one common child node (i.e. right view 190). It will be further appreciated that such use of placeholders can turn a navigation tree into a navigation graph. It will also be appreciated that right view 190 also serves as an integration point between application 180 and application 182. For example, right view 190 is the point at which a user may transition from application 180, into application 182 (or vice versa, if applicable) Similarly, right view 190 may also be considered a fork for inserting one sub-tree (i.e. the one for application 182) into the sub-tree for application 180.

Figure 2:
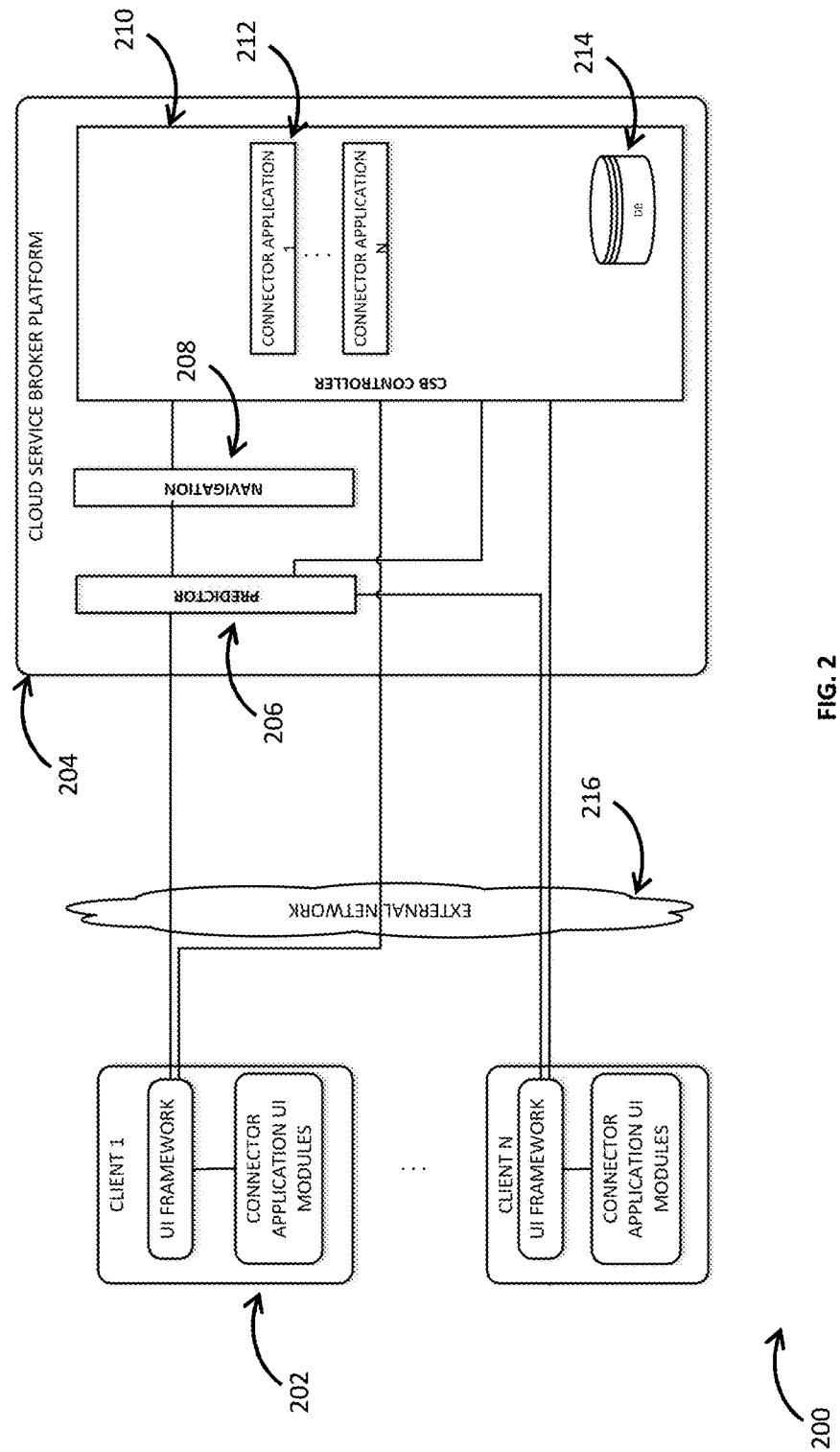
FIG. 2 displays a schematic drawing of a system for generating prediction based GUIs to improve GUI response times.

Referring now to FIG. 2, it is shown an exemplary embodiment of a system for generating prediction based GUIs to improve GUI response times, generally indicated at 200. In at least one embodiment of the present disclosure, the system 200 includes a client 202, a CSB platform 204, a predictor 206, a navigation module 208, a CSB controller 210, and a network 216. In at least one embodiment of the present disclosure, the system 200 may include one or more server computers, computing devices, or systems of a type known in the art. The system 200 further includes such software, hardware, and componentry as would occur to one of skill in the art, such as, for example, microprocessors, memory systems, input/output devices, host bus adapters, fibre channel, small computer system interface connectors, high performance parallel interface busses, storage devices (e.g. hard drive, solid state drive, flash memory drives), device controllers, display systems, and the like. The system 200 may include one of many well-known servers, such as, for example, IBM®'s AS/400® Server, IBM®'s AIX UNIX® Server, or MICROSOFT®'s WINDOWS NT® Server.

In at least one embodiment of the present disclosure, the client 202 may include a combination of GUI framework and connector application-specific modules with web browser to enable client 202 to download JavaScript files with connector-specific code and CSB Platform code for a GUI from CSB controller 210. It will be appreciated that a user may use the client 202 to visit GUI pages of CSB platform 204 integrated with application-specific GUI associated with connector applications 212. Client 202 also handles GUI business logic, performs requests to CSB controller 210 to get, delete or modify any resources, and performs navigation requests to change active view.

In at least one embodiment of the present disclosure, each client 202 includes a single page web application that consists of a JavaScript framework and integrated applications' JavaScript modules. It will be appreciated that the client 202 includes a web browser with a framework and modules running inside. In at least one embodiment of the present disclosure, the client 202 comprises connector application UI modules which are session-scoped storage for connector-specific UI modules (GUI code) of integrated cloud applications which are used by the user of this client 202 (e.g. user has subscriptions for these applications, uses some resources corresponding with these applications and so on, any connections between the user and cloud applications that may require to display the views related to these applications). Initially these modules (GUI code) specific for cloud applications are placed in connector packages in the form of files with source code or UI modules. The metadata of these connector packages describe the hierarchy (direct connections), plugging and required variables (security conditions) for displaying views referred to these pieces of source code.

In at least one embodiment of the present disclosure, the client 202's framework is operably connected to the CSB controller 210 and predictor 206. In at least one embodiment of the present disclosure, the CSB controller 210 is called to perform RESTfull operations with resources, while predictor 206 is called to move to another view in a GUI screen. By way of an example, a framework is responsible for downloading the integrated application-specific UI modules from the CSB platform 204 via the CSB controller 210. Application-specific UI modules are source code files necessary for displaying application-specific views. A view may consist from several UI modules connected to each other. Usually there is a main module representing a particular view. Where the main UI module cannot operate itself, it declares dependent UI modules in the dependencies section based on which a framework may download dependent UI modules for displaying a view.

In at least one embodiment of the present disclosure, the network 216 may include one of the different types of networks, such as, for example, Internet, intranet, local area network (LAN), wide area network (WAN), a metropolitan area network (MAN), a telephone network (such as the Public Switched Telephone Network), the internet, an optical fiber (or fiber optic)-based network, a cable television network, a satellite television network, or a combination of networks, and the like. The network 216 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. It will be further appreciated that the network 216 may include one or more data processing and/or data transfer devices, including routers, bridges, servers, computing devices, storage devices, a modem, a switch, a firewall, a network interface card (NIC), a hub, a bridge, a proxy server, an optical add-drop multiplexer (OADM), or some other type of device that processes and/or transfers data, as would be well known to one having ordinary skills in the art. It should be appreciated that in various other embodiments, various other configurations are possible. Other computer networks, such as Ethernet networks, cable-based networks, and satellite communications networks, well known to one having ordinary skills in the art, and/or any combination of networks are contemplated to be within the scope of the disclosure.

In at least one embodiment of the present disclosure, the CSB platform 204 further includes a predictor 206. The predictor 206 further includes such software, hardware, and componentry as would occur to one of skill in the art, such as, for example, microprocessors, memory systems, input/output devices, device controllers, display systems, and the like, which collectively are operable to perform the functions allocated to the predictor 206 in accordance with the present disclosure. For purposes of clarity, the predictor 206 is shown as a component of the CSB platform 204. However, it is within the scope of the present disclosure, and it will be appreciated by those of ordinary skill in the art, that the predictor 206 may be disparate and remote from the CSB platform 204. It will be further appreciated that the remote server or computing device upon which predictor 206 resides, is electronically connected to the CSB platform 204, the navigation module 208, the CSB controller 210, and the network 216 such that the predictor 206 is capable of continuous bi-directional data transfer with each of the components of the system 200.

In at least one embodiment of the present disclosure, the CSB platform 204 further includes a CSB controller 210. The CSB controller 210 includes at least one connector application 212. It will be appreciated that the CSB controller 210 may include a plurality of connector applications.

In at least one embodiment of the present disclosure, the CSB platform 204 also includes a database 214. Database 214 contains both static and dynamic data. Static data is a connector package metadata such as package name, package version, resource types schema, navigation schema and source code for all connector UI modules. Dynamic data is a state of all resource instances in CSB platform 204 like users, domains, internet protocol (IP) addresses and any connector specific resource instances (e.g. VPS server for VPS connector package). It will be appreciated by those of ordinary skill in the art that database 214 may comprise a plurality of databases connected by software systems of a type well known in the art, which collectively are operable to perform the functions delegated to database 214 according to the present disclosure. Database 214 may also be part of distributed data architecture, such as, for example, Hadoop architecture, for big data services. Database 214 may comprise relational database architecture, noSQL, OLAP, or other database architecture of a type known in the database art. Database 214 may comprise one of many well-known database management systems, such as, for example, SQL databases, NoSQL databases, MICROSOFT's SQL Server, MICROSOFT's ACCESS, MongoDB, Redis. Hadoop, or IBM's DB2 database management systems, or the database management systems available from ORACLE or SYBASE, and any other services required for the application as would be known to one having ordinary skill in the arts. Database 214 retrievably stores information that is communicated to database 214 from within CSB platform 204.

In at least one embodiment of the present disclosure, the system 200 includes a client 202. The client 202 is remote from the CSB platform 204, and connected to the CSB platform 204 via the network 216. The client 202 may be configured to transmit information to and generally interact with the CSB platform 204, over network 216. The client 202 may include a web browser, mobile application, socket or tunnel, or other network connected software such that communication with the CSB platform 204 is possible over the network 216.

It will be appreciated that the client 202 includes one or more computers, smartphones, tablets, wearable technology, computing devices, or systems of a type well known in the art, such as a mainframe computer, workstation, personal computer, laptop computer, hand-held computer, cellular telephone, MP3 player, or personal digital assistant. The client 202 comprises such software, hardware, and componentry as would occur to one of skill in the art, such as, for example, one or more microprocessors, memory systems, input/output devices, device controllers, and the like. The client 202 also comprises one or more data entry means (not shown in FIG. 1) operable by users of the client 202 for data entry, such as, for example, voice or audio control, a pointing device (such as a mouse), keyboard, touchscreen, microphone, voice recognition, and/or other data entry means known in the art. The client 202 also comprises a display means (not shown in FIG. 1) which may comprise various types of known displays such as liquid crystal diode displays, light emitting diode display, and the like upon which information may be display in a manner perceptible to the user. It will be appreciated that client 202 may further comprise such software, hardware, and componentry as would occur to one of skill in the art, to operably perform the functions allocated to the client 202 in accordance with the present disclosure. It will be further appreciated that the system 200, although refers to only one client, it may also include a plurality of clients.

In at least one embodiment of the present disclosure, the client 202 includes a combination of GUI framework and application-specific modules, well known to one having ordinary skills in the arts. The GUI framework handles GUI business logic, and performs requests to CSB controller 210, which CSB controller 210 is configured to perform actions such as, create, read/get, delete, or modify resources. It will be further appreciated that the client 202's GUI is operably configured to perform navigation requests to change the present GUI view.

Figure 3:
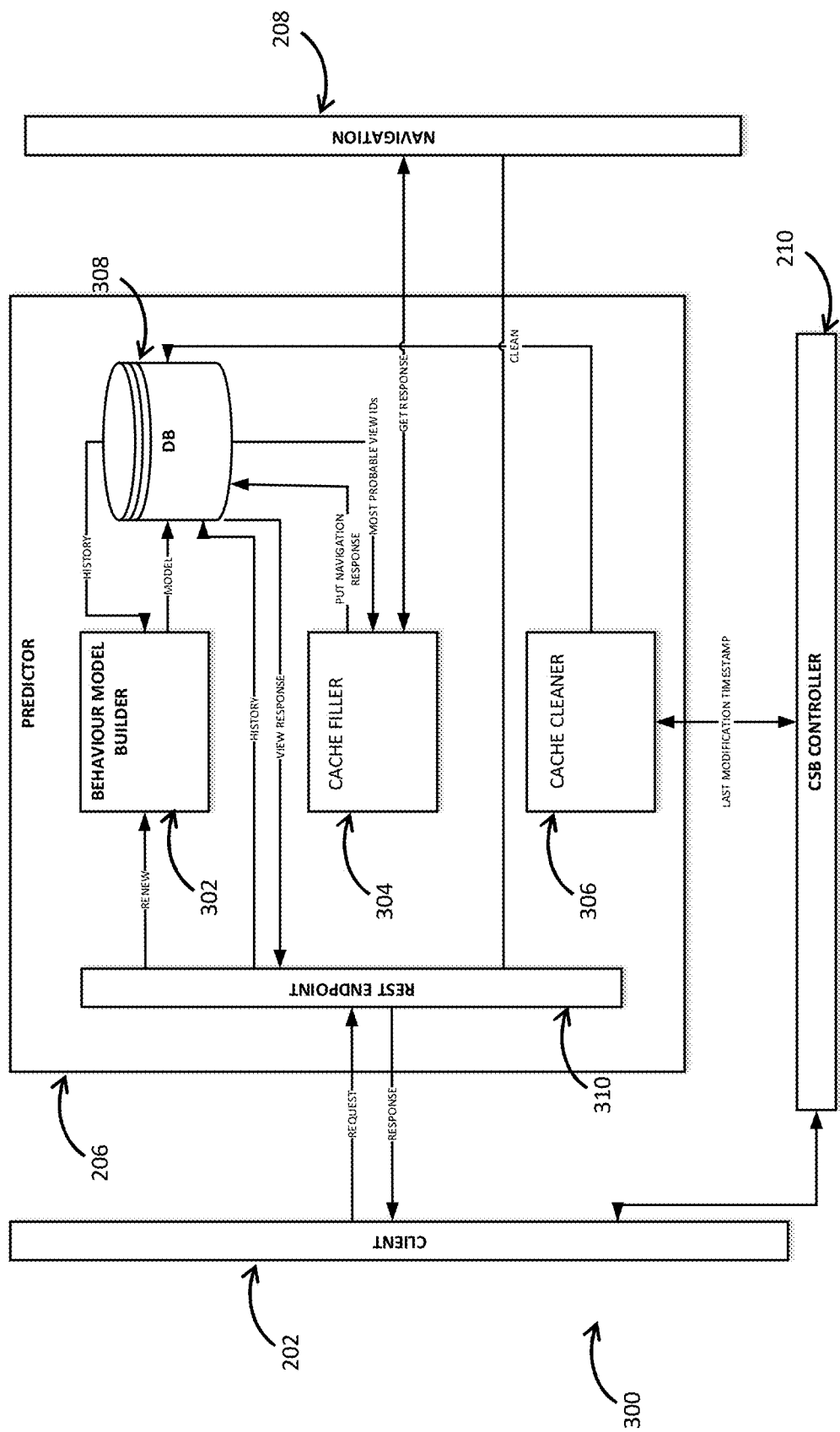
FIG. 3 displays a schematic drawing of a system for generating prediction based GUIs to improve GUI response times.

Referring now to FIG. 3, it is shown an alternate view of the predictor 206, in at least one embodiment of the present disclosure. The predictor 206 includes a behavior model builder 302, a cache filler 304, a cache cleaner 306, a database 308, and a REST endpoint 310. In at least one embodiment of the present disclosure, the behavior model builder 302 is configured to rebuild a prediction model with new data from history, as further disclosed herein. The behavior model builder 302 builds prediction model with transition probabilities and is configured to store such prediction models into the database 308.

In at least one embodiment of the present disclosure, the cache filler 304 is configured to retrieve navigation responses for the most probable views to be visited by user operating a GUI, as further disclosed herein. The navigation responses may include JavaScript Object Notation (JSON) responses, containing subgraph information about target view, availability resources context, backward path, and applicable parent elements. It will be appreciated that the cache filler 304 will not retrieve navigation responses for more probable views than the predefined amount each time so as not to overflow the prediction 206 cache. The cache filler 304 if further configured to save navigation responses (e.g. a navigation tree) received from navigation module 208, into a request-response cache (stored within database 308). In at least one embodiment of the present disclosure, the database 308 stores the history of visited GUI views, prediction models, identifiers of probable views, GUI screen navigation responses, and the like, as further disclosed herein.

By way of example, the following is an exemplary list of possible navigation transactions:

| Number | Request | Response |
|---|---|---|
| 1 | View: "Home" | View: "Home",<br>Source: "home.js",<br>MenuItems: ["Home", "UserList"] |
| 2 | View: "UserList",<br>Context: ["Home"] | View: "UserList",<br>Source: "userlist.js",<br>MenuItems: ["Home", "UserList"]<br>Context: ["Home"] |
| 3 | View: "NewUser",<br>Context: [<br>"Home",<br>"UserList"<br>] | View: "NewUser",<br>Source: "newuser.js",<br>MenuItems: ["Home", "UserList"]<br>Context: [<br>"Home",<br>"UserList"] |
| 4 | View: "AssignService",<br>resource_id: 126,<br>Context: [<br>"Home",<br>"UserList",<br>"NewUser"<br>] | View: "AssignService",<br>Source: "assignservice.js",<br>MenuItems: ["Home", "UserList"]<br>Context: [<br>"Home",<br>"UserList",<br>"NewUser"]<br>Vars: [<br>"Subscription":<br>{<subscription_object>}] |
| 5 | View: "NewVPS",<br>resource_id: 126,<br>Context: [<br>"Home",<br>"UserList",<br>"NewUser",<br>"AssignService"<br>] | View: "NewVPS",<br>Source: "configurevps.js",<br>MenuItems: ["Home", "UserList"]<br>Context: [<br>"Home",<br>"UserList",<br>"NewUser",<br>"AssignService"<br>]<br>Vars: [<br>"Subscription":<br>{<subscription_object>}] |
| 6 | View: "UserView",<br>Resource_id: 126 | View: "UserView",<br>Source: "userview.js",<br>MenuItems: ["Home", "UserList"]<br>Vars: ["User": {<user_object>}]<br>Context: [ ] |

In at least one embodiment of the present disclosure, the cache cleaner 306 is configured to request CSB controller 210 for the last security scope modification timestamp, as further disclosed herein. For example, there may be numerous security conditions that may be applicable to a user's GUI transition. These conditions can affect the resources available to such user (and consequently available views related to connector packages the metadata of which sets resources operated by the referred connector application), and which conditions (or resources) can change over time. Continuing with this example, if a requested navigation element requires forbidden or non-existent resources for resolving security conditions, the navigation element will not be included in the navigation response and thus the view is unavailable for user. (i.e. A user may not be able to access all available resources because he/she does not have access to such resources.) By way of another example, suppose a user is a subscriber to a service plan of the cloud service broker, that cover selling subscriptions only to Dropbox® and Office 365®, the user should not be shown views related to other applications integrated with the CSB platform 204 and associated with referred resources (e.g. "VPS server"). By way of another example, to restrict GUI transitions or substitute one view with another is security conditions expressed through the mechanism of variables. Navigation metadata includes domain specific language for describing security conditions based on resources available in the user's security scope. Examples of non-limiting conditions include: both resources are available, none of resources are available, resource is available and contains an attribute with a particular value, and the like. In one embodiment of the present disclosure, this domain specific language is based on Resource Query Language (RQL).

It will be appreciated that the last modification timestamp determines the last date of any resource modification/provisioning or deletion in scope of current prediction model. If the scope was modified after the cache was created, the cache cleaner 306 cleans the request-response cache ((cache may be stored on database 308). In at least one embodiment of the present disclosure, each user is associated with a token that is used to carry out all transactions within the system. For example, a token is associated to the user's security scope, and which security scope is retrievable (e.g. from database 308) based on the token. The database 308 is configured to store view responses associated for each user token, thereby presenting a customized view response applicable to each user, and based at least in part on the user's security scope.

In at least one embodiment of the present disclosure, the cache cleaner 306 is configured to access the each of the user tokens and periodically requests changes in security scope associated with token, from the CSB controller 210. It will be appreciated that if the security scope associated with a token is changed, the cache cleaner 306 "cleans" (i.e. modifies or deletes) the ready view responses in database 308, associated with such token.

In at least one embodiment of the present disclosure, the navigation module 208 is configured to build navigation graphs and response used for the construction of GUI screens, as further disclosed herein. In at least one embodiment of the present disclosure, the navigation module 208 is configured to integrate with each of the plurality of connector applications 212 via CSB controller 210 (which connector applications 212 may be provided by ISVs or third party connector developers). The navigation module 208 is configured to generate a navigation tree (e.g. as shown in FIG. 1C), as further disclosed herein.

In at least one embodiment of the present disclosure, the REST endpoint 310 simulates a navigation endpoint, and is configured to receive requests and provide valid navigation responses, as further disclosed herein. For example, during a GUI operation that is an add request, an operation item is added to a navigation history list. The REST endpoint 310 is further configured to calculate new items count and periodically (e.g. for each 100th request) call behavior model builder 302 to rebuild the model with new data based on the navigation history list. It will be appreciated that on each request the REST endpoint 310 is configured to communicate with the cache stored in the database 308 to request pre-calculated response if any. If there is no response the REST endpoint 310 is configured to query the navigation service directly and return a response. It will be further appreciated that on each request call by the REST endpoint 310, the cache history is rotated to prevent overconsumption of disk space and memory. It will also be appreciated that the cache cleaner 306 operates to invalidate the cache if necessary.

In at least one embodiment of the present disclosure, the REST endpoint 310 is configured to store a history of visited views into database 308, as further disclosed herein. For example, if a user operates a GUI screen, the history of visited views of the GUI screen is stored into the database 308. In at least one embodiment of the present disclosure, the REST endpoint 310 is configured to retrieve a particular view response (navigation response for the particular view) of a GUI screen from the database 308. If a response is not received (i.e. the particular view response is not available), the REST endpoint 310 is configured to request a view response from navigation 208. It will be appreciated that when the predictor 206 collects information about user activity, such activity information is stored in the database 308. It will be further appreciated that the behavior model builder 302 may use this information in database 308 to develop GUI screen transition prediction models, as further disclosed herein.

In at least one embodiment of the present disclosure, GUI transition views, GUI steps, user experience, may be retrieved from third party databases (not shown), such as business intelligence systems, customer relationship management systems, and the like. Such information may be stored within database 308.

Figure 4:
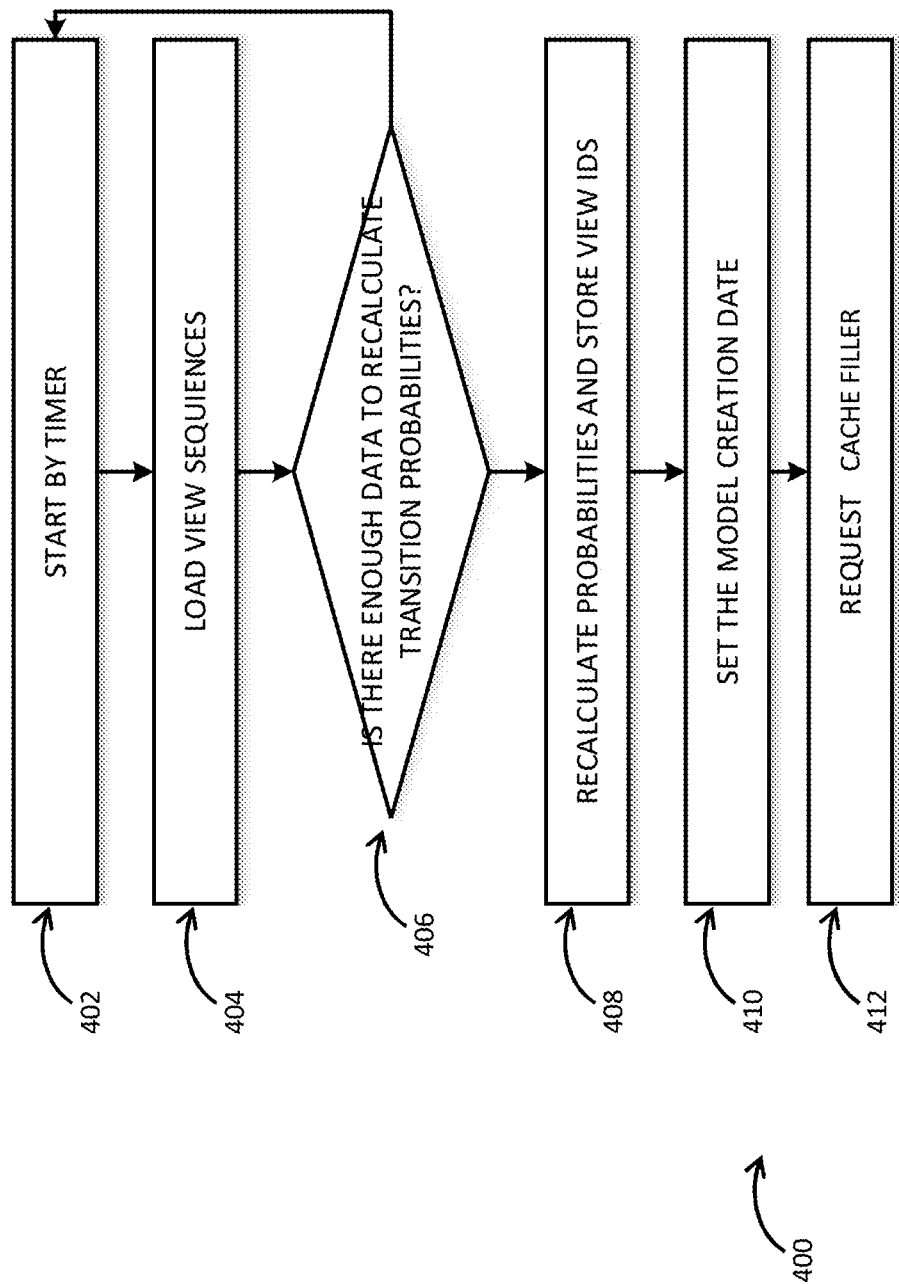
FIG. 4 displays a schematic drawing of a method for generating prediction based GUIs to improve GUI response times.

Referring now to FIG. 4, it is shown a method for generating prediction based GUIs to improve GUI response times, generally indicated at 400. In at least one embodiment of the present disclosure, the method 400 includes a start by timer at step 402, loading view sequences at step 404, checking for data at step 406, recalculating probabilities at step 408, setting a model creation date at step 410, and requesting cache filler at step 412.

In at least one embodiment of the present disclosure, the method 400 describes the sequence of managing GUI screen and transitions. It will be appreciated that in any GUI screen, a transition from the present state to a future state (a new GUI screen) includes a certain probability of the occurrence of such an activity. For example, if the GUI screen is a log in screen into an application (e.g. application 182), the present state of such a GUI screen may include areas to enter login credentials, and submit such credentials. In such an exemplary embodiment, the future state (i.e. the next GUI screen) can likely be: 1) a successful login; or 2) an unsuccessful login. Continuing with this example then, the likely probability of a successful login (which is dependent on security restrictions) or unsuccessful login, is an exemplary probability calculation of the GUI transition. That is, the transition from the login GUI screen may be limited to essentially two options: a successful login GUI screen, or an unsuccessful login GUI screen.

It will be appreciated that that a user performing GUI steps is essentially sequentially accessing a series of GUI screen (or view). In at least one embodiment of the present disclosure, the GUI screen is a predefined set of views that may be set as part of an application (e.g. application 182). It will be appreciated that when a user uses an application (e.g. application 182), the possible GUI screens is limited. For example, referring to the FIG. 1, it is possible to go to GUI state 110 (NewUser) from GUI state 102 (Home), but this scenario is unlikely to be implemented if it does not logically flow and if there is no business case requiring such functionality support. However, other GUI transitions and screens connections will almost exclusively be used almost in a predefined order. For example, referring to FIG. 1B, adding a new user implies passing GUI state 106 (User View) screen, because this connection between views is static and is developed as the main logic path. It will be appreciated then that a navigation model created based on the state diagram 150 assumes there often are most probable next or previous GUI states (or GUI screens) that are access or viewed in specific serial sequence (i.e. a user's GUI activity is linear). In at least one embodiment of the present disclosure, it is possible to use machine learning algorithms to find patterns and predict the next most probable GUI screen (or GUI state) in the chain of user activity.

In at least one embodiment of the present disclosure, a navigation tree can be built using a large static model, whereby the main usage scenarios for most usable GUI screens or application are managed. By way of example, almost every user fills in contact data when updating his/her profile; every administrator opens a list of users to manage; every administrator is redirected to the list of users after creating new user. It will be appreciated that these predefined behaviors can be predicted based on the present state of the GUI screen. It will be further appreciated that the navigation tree for a user can be developed based on prior user behavior. Referring to state diagram 150 as an example, the user administrator access the GUI state 120 (Home) and may then checks notifications first. The administrator may also perform other actions such as provision access, lock/unlock users, and the like. Continuing with this example, a predictive model can be built based on the most probable navigation sequences.

It will be appreciated that several sequence prediction mechanisms may be used, such as, Ngram model, Hidden Markov Model, Maximum-entropy Markov model (combination of entropy-bases classificatory and Hidden Markov Model), hidden classifiers including, but not limited to, SVM (support vector machine), decision tree classifiers, random forest classifiers, K nearest neighbors, and any Neural Network able to perform sequence prediction, to name a few non-limiting examples.

Referring again to method 400, the process starts by timer at step 402. In at least one embodiment of the present disclosure, a timer is used to schedule calculations of GUI transitions probabilities and behavior models. The predictor 206 verifies if there is enough data (i.e. in the cache in database 308) to calculate transition probabilities based on the saved sequences of views. If there is insufficient data, the method 400 reverts to step 402, but processed to step 408 otherwise.

At step 408, the transition probabilities are calculated and a transition probabilities model is created and the model creation date is set at step 410. For example, an input of a classifier is a set of features, and the output is an array of probabilities that the given the set of features, a particular outcome (i.e. a GUI event) will occur. For example, the behavior model builder 302 calculates probabilities of the most likely GUI transitions. It will be appreciated that the probabilities calculated are indicative of the likelihood of a user transition from a present GUI view to a future GUI view. By way of example, a GUI screen may display controls for user administration (e.g. create/update a user role). A system administrator user operating the user administration GUI screen to create a "new user" will first start at the main user administration screen. The next screen (i.e. the next step) is likely a form screen to fill in demographic information about the new user, such as, for example, the full name of the user, the contact information, and the like. Continuing with this example then, the most probable future view for the system administrator user presently at the create new user screen, will likely be the form screen. The lesser probability is that the system administrator user returns to the previous screen, without accessing the form screen.

In at least one embodiment of the present disclosure, the cache filler 304 is then called to save the transition probabilities model to cache and to database 308.

Figure 5:
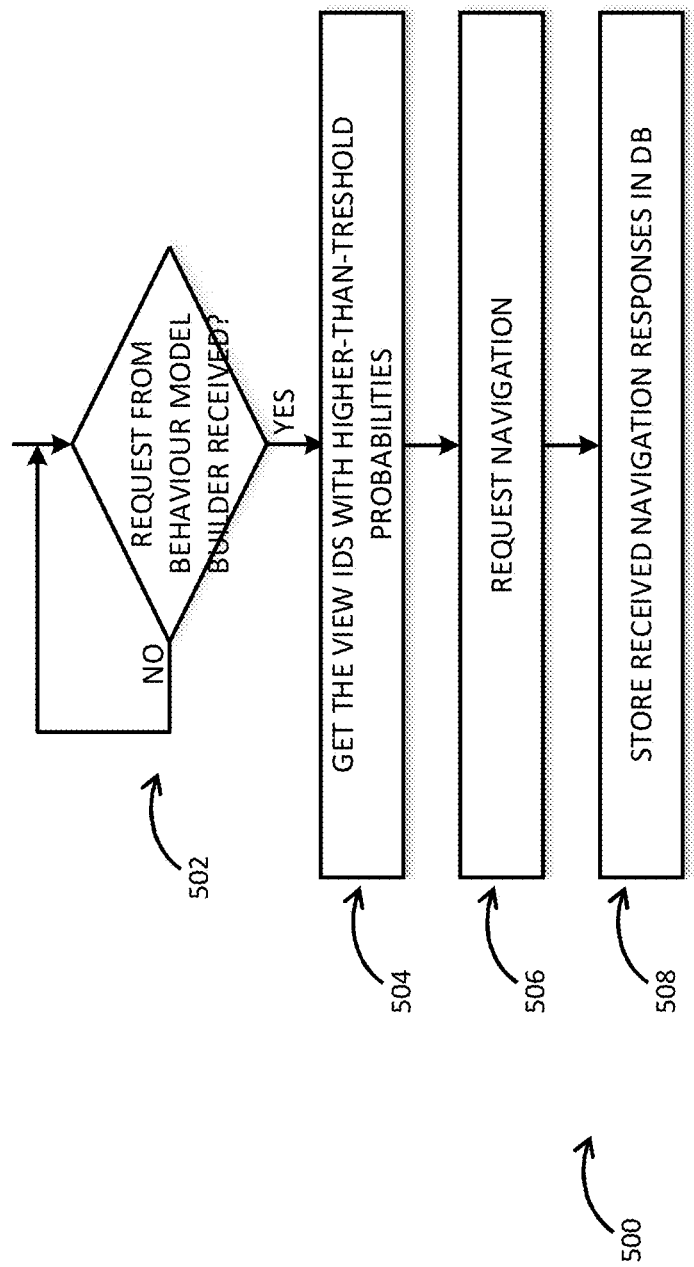
FIG. 5 displays a schematic drawing of a method for generating prediction based GUIs to improve GUI response times.

Referring now to FIG. 5, it is shown a method for generating prediction based GUIs to improve GUI response times, generally indicated at 500. In at least one embodiment of the present disclosure, the method 500 manages request handling by checking if a request is received from behavior model builder 302 at step 502, getting view IDs with higher than threshold probability to be requested based on behavior model predictions at step 504, requesting navigation 208 at step 506, and storing received view responses (i.e. navigation responses) at step 508.

In at least one embodiment of the present disclosure, each received request for a GUI screen (or view) is saved to database 308 as a request sequence.

In at least one embodiment of the present disclosure, GUI view IDs with higher-than-threshold probabilities are retrieved at step 504. By way of example, thresholds can be different and depends on the type of probability model used—a Hidden Markov Model (HMM) will have a different threshold compared to a Random Forest Classifier. In at least one embodiment of the present disclosure, the data used to calculate such probabilities is the data accumulated for previous user transitions (and stored in database 308). It will be appreciated that the data may include GUI transition chains. Continuing with the above example, in Random Forest Classifier (RFC) modeling, the RFC model is fit with the data and outputs an array of probabilities. Having probabilities distribution, count of simultaneously working users and memory limitation, an optimal threshold can be defined which satisfies all requirements: maximum data in cache, limited cache size. It will be appreciated that although all probabilities of transitions may be calculated, on the most likely transition probabilities are calculated to ensure efficient use of limited memory/cache storage for storing such models.

It will be further appreciated that the present disclosure provides the unified prediction service for collect data about clients, which can be useful for testing purposes or user behavior analysis that can be further used for optimizing GUI views and navigation.

If model contains next IDs of GUI views with transition probabilities higher than threshold, navigation responses for those GUI views are prepared as possible responses, at step 506. The responses are stored in the database 308.

Figure 6:
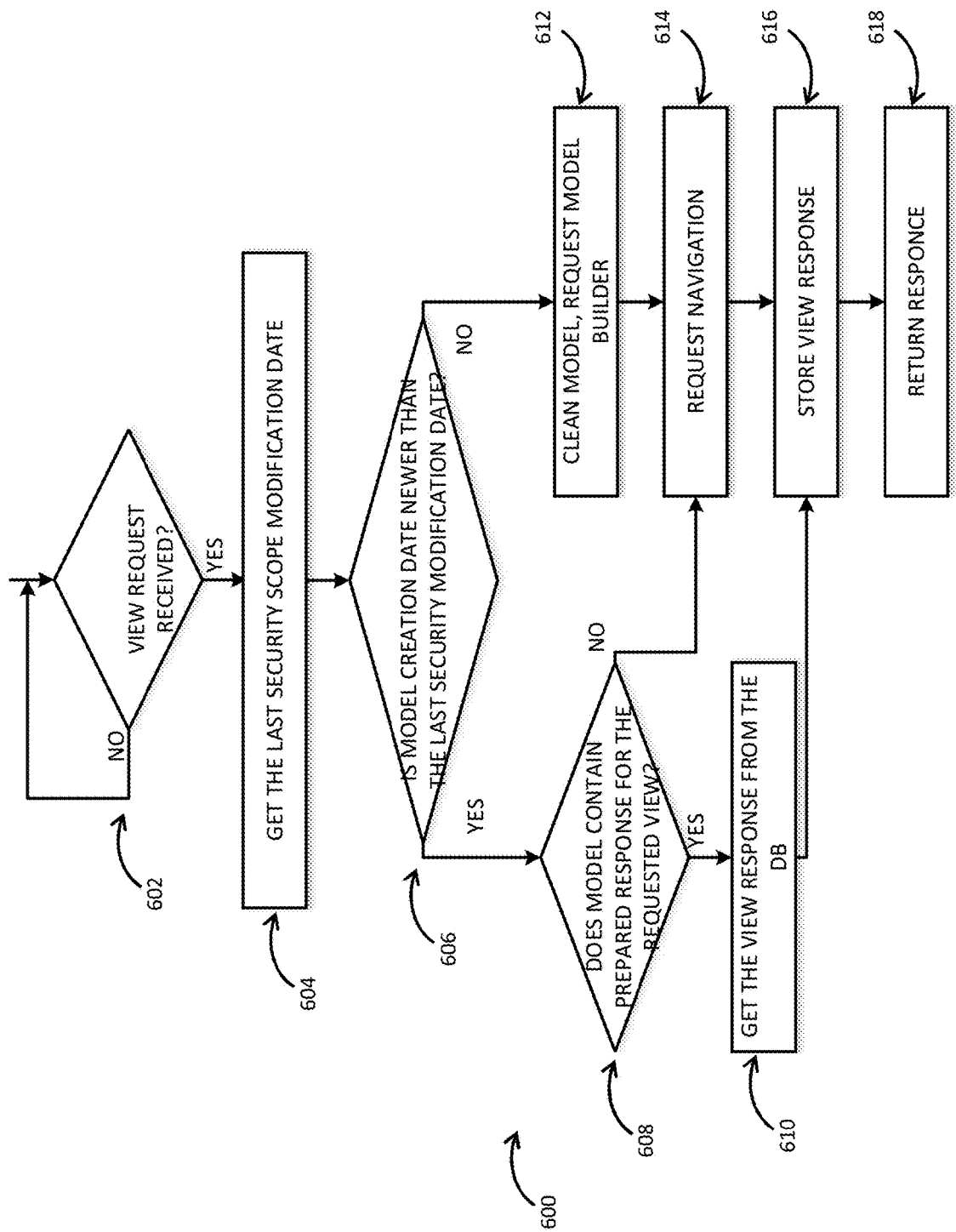
FIG. 6 displays a schematic drawing of a method for generating prediction based GUIs to improve GUI response times.

Referring now to FIG. 6, it is shown a method for generating prediction based GUIs to improve GUI response times, generally indicated at 600. The method 600 includes checking if a GUI view request is received at step 602, getting the last security scope modification date at step 604, checking if the transition probability model is newer than the security scope modification date at step 606, and if yes, then proceeding to step 608, otherwise, proceeding to step 612.

In at least one embodiment of the present disclosure, method 600 further includes checking if the model contains prepared navigation responses for the requested GUI view at step 608, and getting the GUI view response (navigation response) from the database 308 at step 610. In at least one embodiment of the present disclosure, the method 600 further includes step 614 of requesting a navigation at step 614, storing the GUI view response in database 308 at step 616, and returning the response at step 618.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for generating prediction based graphical user interface (GUI) screens to improve GUI screen response times, the method comprising the steps:
   receiving at an endpoint, a view request for a GUI screen, the GUI screen comprising an integrated user interface constructed from of a plurality of connector packages;
   validating at a predictor, a validity of a GUI transition model, the GUI transition model corresponding to each of the plurality of connector packages;
   building at a behavior model builder, a new GUI transition model, the new GUI transition model comprising a plurality of transition probabilities for each possible transition from the GUI screen, the plurality of transition probabilities depending at least in part on resource attributes available to each of the plurality of connector packages;
   retrieving, by a cache filler, most probable GUI views to be visited by a user, based at least in part on the GUI transition model;
   cleaning, by a cache cleaner, a response cache based at least in part on whether a security scope modification date is newer than the GUI transition model;
   selecting at the behavior model builder, a likely transition from the plurality of transition probabilities, the likely transition being a transition to a new GUI screen that is most likely to be requested;
   creating at a navigation module, a navigation tree based at least in part on the likely transition; and
   returning a response to the endpoint, the response comprising the navigation tree, and further comprising a navigation response for the new GUI screen.

2. The method of claim 1, wherein the each of the plurality of transition models is selected from a group consisting of an Ngram model, a hidden Markov model, and a maximum entropy Markov model.

3. The method of claim 2, wherein the each of the plurality of transition models further comprises boosted classifiers selected from a group consisting of support vector machine (SVM), decision tree, random forest, and nearest K neighbors.

4. The method of claim 1, wherein the request for the GUI screen is received from a client.

5. The method of claim 1, wherein the GUI transition model comprises a security scope modification date.

6. The method of claim 1, wherein validating the GUI transition model comprises checking a last modified security scope date.

7. The method of claim 6, where in the last modified security scope date comprises a date when the GUI transition model was last modified.

8. The method of claim 1, further comprising the step of storing the response in a database.

9. The method of claim 8, further comprising the step of storing the new GUI transition model.

10. The method of claim 9, further comprising storing a model creation date for the new GUI transition model.

11. A method for generating prediction based graphical user interface (GUI) screens to improve GUI screen response times, the method comprising the steps:
    receiving at a representational state transfer (REST) endpoint, a navigation request for a first GUI screen;
    checking at a predictor, a security scope modification date, the security scope modification date comprising a set of resources available to a user for whom the navigation request for the first GUI screen is being requested;

retrieving at the predictor, a GUI transition model, the GUI transition model identifying a new GUI screen for transition from the first GUI screen;

retrieving, by a cache filler, most probable GUI views to be visited by a user, based at least in part on the GUI transition model;

checking at the predictor, if a creation date of the GUI transition model is newer than the security scope modification date;

cleaning, by a cache cleaner, a response cache based at least in part on whether the security scope modification date is newer than the GUI transition model; and retrieving at the predictor, a response, the response comprising a navigation tree with a link to new GUI screen source code and current resource state of a user necessary for executing the GUI screen source code.

12. The method of claim 11, wherein the navigation tree is a navigation graph showing GUI transitions.

13. The method of claim 11, wherein checking at the predictor if the GUI transition model is newer than the security scope modification date, further comprises the step of cleaning the GUI transition model and requesting creation of a new GUI transition model, if the GUI transition model is older.

14. The method of claim 11, further comprising the step of storing the response at a response cache.

15. The method of claim 11, further comprising step of returning the response to the REST endpoint.

16. A system for generating prediction based graphical user interface (GUI) screens to improve GUI screen response times, the system comprising:
a cloud service broker platform comprising:
  a predictor;
  a database;
  a behavior model builder configured to create a GUI transition model, the GUI transition model being a likelihood of a GUI transition from a first GUI screen to a new GUI screen, wherein the new GUI screen comprises an integrated user interface constructed from of a plurality of connector packages;
  a cache filler configured to retrieve most probable GUI views to be visited by a user, based at least in part on the GUI transition model;
  a navigation module configured to create navigation responses for the new GUI screen based at least in part on at least one resource state of a security scope applicable to a user requesting the new GUI screen;
  a cache cleaner configured to clean a response cache based at least in part on whether a security scope modification is newer than the GUI transition model; and
  a representational state transfer (REST) endpoint configured to simulate a GUI navigation service endpoint.

17. The system of claim 16 further comprising a client operably connected to the cloud service broker platform, and configured to request a new GUI screen and receive a navigation response for the new GUI screen.

18. The system of claim 16, wherein the cloud service broker platform further comprises a cloud service broker controller.

19. The system of claim 18, wherein the cloud service broker controller comprises a plurality of connector applications, the each of the plurality of connector applications configured for each application for integration via the cloud service broker platform.

20. The system of claim 16, wherein the plurality of connector packages comprises user interface modules for constructing navigation elements.

21. The system of claim 20, wherein the plurality of connector packages further comprises a security scope for each of the navigation elements.

* * * * *